(12) United States Patent
Huang et al.

(10) Patent No.: US 8,111,434 B2
(45) Date of Patent: *Feb. 7, 2012

(54) OPTICAL DEVICE OF SCANNER

(75) Inventors: Yin-Chun Huang, Hsinchu (TW); Po-Hua Fang, Hsinchu (TW)

(73) Assignee: Transpacific Systems, LLC, Wilmington, DE (US)

( * ) Notice: Subject to any disclaimer, the term of this patent is extended or adjusted under 35 U.S.C. 154(b) by 1498 days.

This patent is subject to a terminal disclaimer.

(21) Appl. No.: 11/511,740

(22) Filed: Aug. 28, 2006

(65) Prior Publication Data

US 2007/0070462 A1 Mar. 29, 2007

Related U.S. Application Data

(63) Continuation of application No. 10/664,936, filed on Sep. 22, 2003, now Pat. No. 7,242,502.

(30) Foreign Application Priority Data

Sep. 10, 2002 (TW) .............................. 91215035 U

(51) Int. Cl.
*H04N 1/04* (2006.01)

(52) U.S. Cl. ........ 358/474; 358/475; 358/482; 358/483; 358/497

(58) Field of Classification Search .................. 358/474, 358/475, 497, 483, 482, 473, 487, 484, 509, 358/505, 506, 512–514, 296, 401; 250/208.1, 250/239, 216, 234–236; 359/212; 355/67, 355/68; 382/312, 313

See application file for complete search history.

(56) References Cited

U.S. PATENT DOCUMENTS

| 4,957,689 | A | * | 9/1990 | Ohnishi et al. | 358/296 |
| 5,519,513 | A | * | 5/1996 | Copenhaver et al. | 358/475 |
| 5,617,131 | A | * | 4/1997 | Murano et al. | 347/233 |
| 6,239,885 | B1 | * | 5/2001 | Sato et al. | 358/483 |
| 6,917,453 | B1 | * | 7/2005 | Onishi et al. | 358/483 |
| 7,576,895 | B2 | * | 8/2009 | Chen | 358/474 |
| 2004/0057097 | A1 | * | 3/2004 | Huang et al. | 359/212 |
| 2005/0002317 | A1 | * | 1/2005 | Hakamata | 369/121 |

FOREIGN PATENT DOCUMENTS

JP 58115976 A * 7/1983

* cited by examiner

*Primary Examiner* — Cheukfan Lee
(74) *Attorney, Agent, or Firm* — Stolowitz Ford Cowger LLP

(57) ABSTRACT

The invention relates to a scanner's optical device, receive the light coming from the image of an object to be scanned, comprising: several reflective mirrors, a light-focusing module, and a charge coupled device. The reflective mirrors provide reflection and directional change for the light and, by appropriately arranging several reflective mirrors, the light of the object to be scanned directionally changed to a predetermined route. With at least one curving mirror, the light-focusing module focus the light of the predetermined route and then directionally change it, and a raster is then provided in the light route of the curving mirror for filtering out unnecessary light. The charge coupled device may receive the light coming from the light-focusing module and convert it into electronic signals. The said light-focusing module replaces the prior lens set for executing a scanning job.

31 Claims, 11 Drawing Sheets

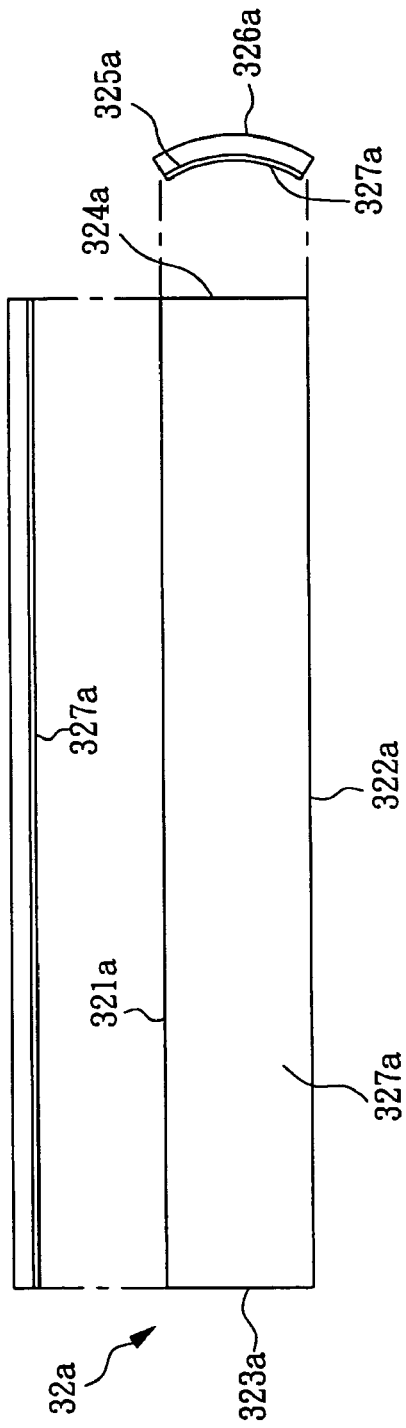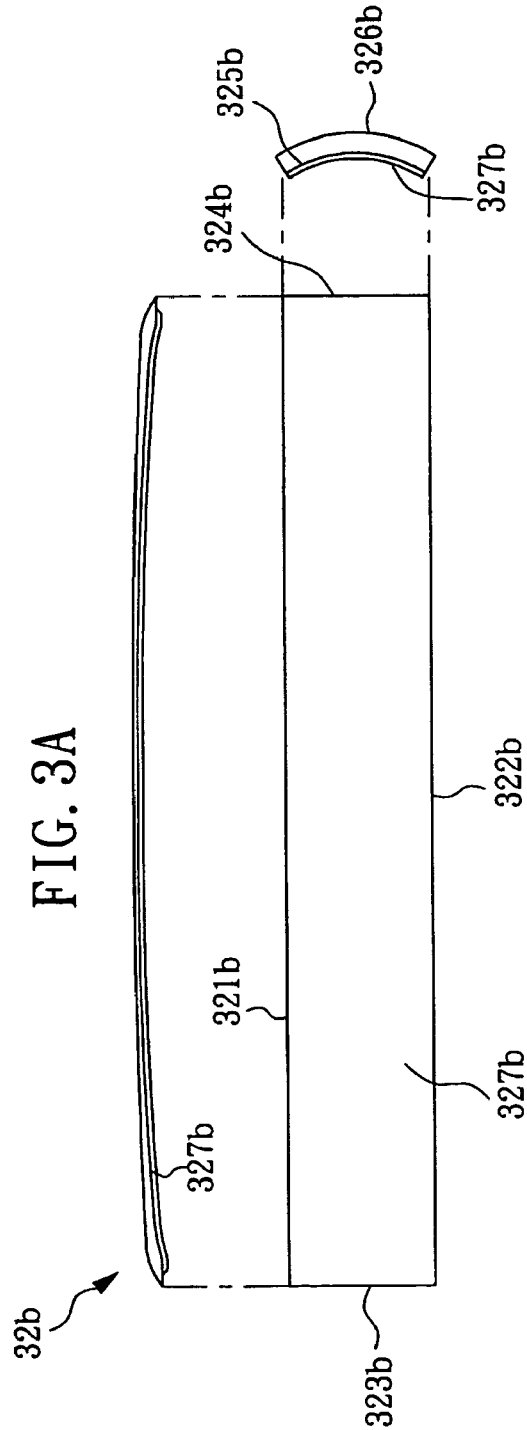
FIG. 3A
FIG. 3B

OPTICAL DEVICE OF SCANNER

CROSS-REFERENCE TO RELATED APPLICATIONS

The present application is a continuation of U.S. application Ser. No. 10/664,936 filed Sep. 22, 2003 now U.S. Pat. No. 7,242,502, which claims the benefit under 35 U.S.C. §119 and 37 C.F.R. §1.55 of Taiwanese Application No. 091215035 filed Sep. 10, 2002. Both of these applications are incorporated by reference in their entireties.

FIELD OF THE INVENTION

The invention relates to a kind of scanner, which may proceed flatbed scanning or paper-feeding scan with automatic document feeder, and which particularly relates to a scanner's optical device that may achieve a scanning job without lens set.

BACKGROUND OF THE INVENTION

Please refer to FIG. 1, which is an embodiment of a typical flatbed optical scanner 1 commonly seen in current market. Its main structure is that a document window glass 12 is arranged at the upper surface of the casing 11 of a scanner 1 for supporting a document to be scanned (not shown in the figure), and an optical chassis 14 is brought along by a driving device 13 to proceed linear motion along the direction of a guiding rod 15 in the hollow casing 11, such that an image scanning job is executed to the document placed on the glass 12.

Please refer to FIG. 2, which is the A-A cross-sectional view of the optical chassis 14 of an optical scanner 1 of the prior art shown in FIG. 1. The optical chassis 14 includes: a hollow casing 141, a light source 142 positioned at an appropriate position on the upper surface of the casing 141, a light-guiding device comprised by plural reflective mirrors 143, a lens set 144, and a charge coupled device (CCD) 145. The light source 142 first emits light toward the document (not shown in the figure) placed on the glass 12. After the reflected light entering the casing 141 of the optical chassis 14, it is reflected and directionally changed again by plural reflective mirrors 143 of the light-guiding device for increasing its optical length to an appropriate length and, focused by the lens set 144, the reflected light is formed as an image on the charge coupled device 145 that converts the scanned image into electronic signals, and the total track (abbreviated as TT) needed for focusing a clear image is just equal to the total value of Y1+Y2+ . . . +Y6 shown in FIG. 2.

Since the lens set 144 of the prior optical chassis 14 shown in FIG. 1 and FIG. 2 is comprised of the devices, such as convex lens, etc., so the element, the structure, and the assembly all are complicated, and its manufacturing cost is higher, and the lens set 144 will generate light-color separating effect too, such that the scanning quality is influenced and the manufacturing cost is also caused to be increased substantially. All these problems are anxiously to be solved by the relative businesses that manufacture the product of optical scanner.

SUMMARY OF THE INVENTION

The main objective of the invention is to provide a scanner's optical device, which applies a light-focusing module for replacing the focusing design of the prior lens set of an optical scanner, such that the objective of reducing the cost of the prior scanner may be achieved effectively.

The secondary objective of the invention is to provide a scanner's optical device, which applies the design of a thin film coated on the light-reflective surface of the light-focusing module, such that the color-light separating phenomenon generated from the refraction of glass may be avoided effectively.

In order to reach the said objectives achievable by the scanner's optical device provided by the invention, the optical device of the scanner may receive the light coming from an object to be scanned, and the optical device is comprised of several reflective mirrors, a light-focusing module, and a charge coupled device.

The reflective mirror may provide reflection and directional change for the light and, by arranging several reflective mirrors appropriately, the light of the object to be scanned may be directionally changed to a predetermined route.

The light-focusing module at least includes: at least one curving mirror and a raster. The curving mirror may focus the light of the predetermined route and then directionally change it, and the raster is provided in the light route of the curving mirror for filtering out unnecessary light.

The charge coupled device may receive the light coming from the light-focusing module and convert it into electronic signals.

In another preferable embodiment of the invention, wherein the reflective mirror is adjustable and, by adjusting the relative positions of the several reflective mirrors, an optical length for proceeding scanning function may be changed, and the several adjustable reflective mirrors are arranged appropriately, such that the light of the image of the object to be scanned is directionally changed to a predetermined route.

For your esteemed reviewing committee to further understand the operational principle and the other function of the invention in a more clear way, a detailed description in cooperation with corresponding drawings is presented as follows.

BRIEF DESCRIPTION OF THE DRAWINGS

FIG. 3A illustrates the upper view, the front view, and the side view of the No. 1 concave mirror according to the invention.

FIG. 3B illustrates the upper view, the front view, and the side view of the No. 2 concave mirror according to the invention.

DETAILED DESCRIPTION OF THE INVENTION

The main characteristic of the optical device of the scanner according to the invention is to give up the lens set that focuses light into image used in the traditional scanner, instead at least one curving mirror being used for proceeding the light to be formed as an image on a charge coupled device that in turn converts the image into electronic signals; furthermore, a raster is cooperated to separate unnecessary light for providing better image's quality and, since the invention unnecessarily uses any lens set, so it has lower cost and advantage of no generation of light-color separating phenomenon.

In order to describe the detailed means, motion manner, achievable function, and other technical characteristic of the invention, several preferable embodiments will be presented as follows.

To describe the technical characteristic and the executing manner of the invention, several executing patterns for the curving mirror and the raster of the invention will be introduced first.

Figure 1:
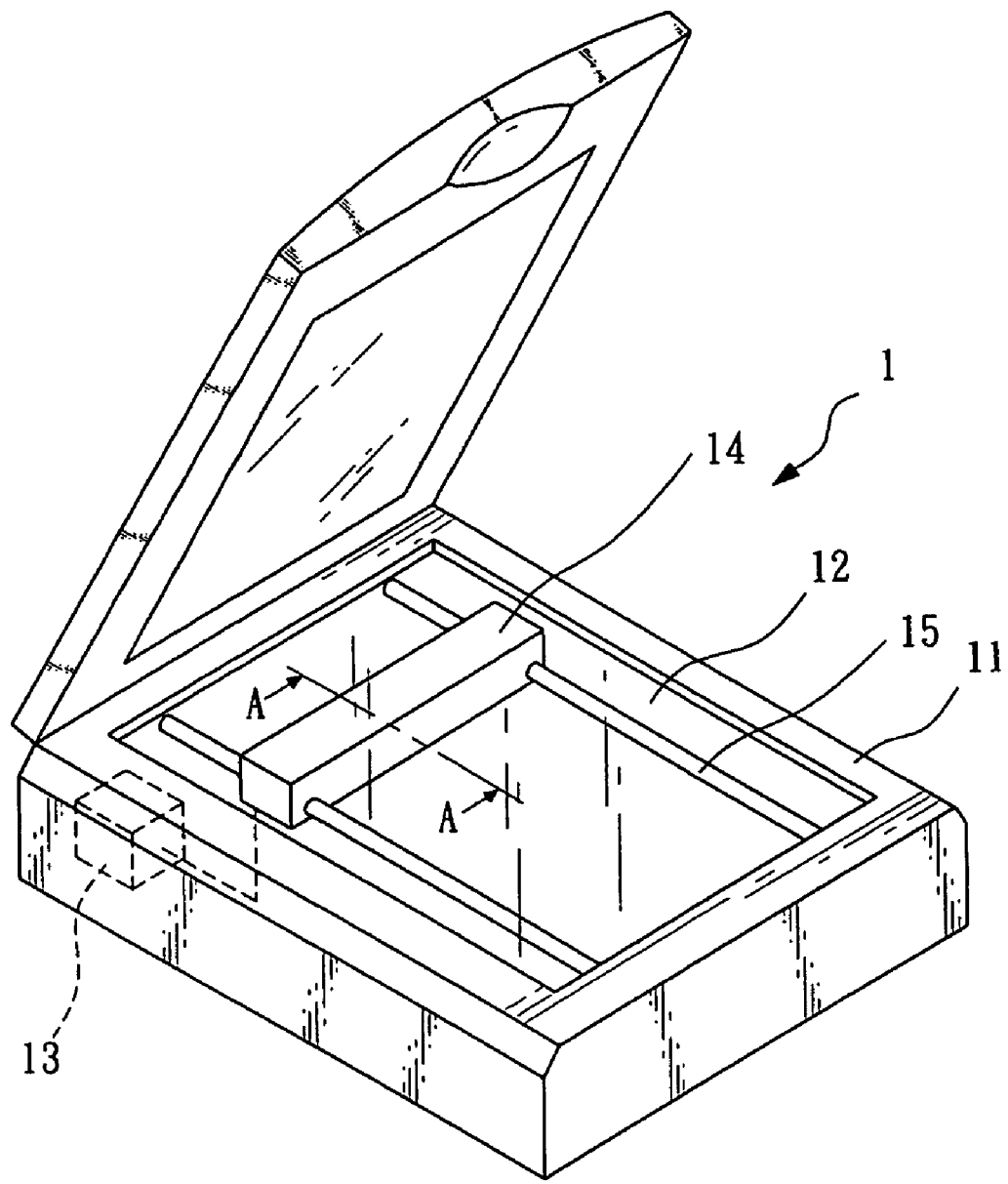
FIG. 1 is an illustration of an optical scanner according to the prior arts.
Figure 2:
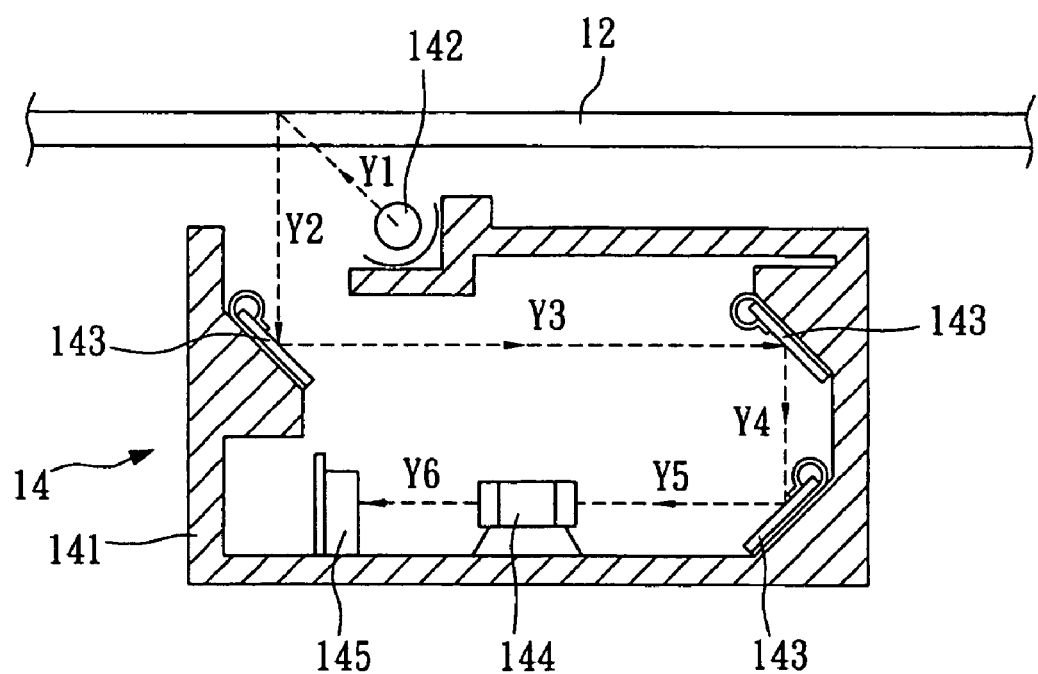
FIG. 2 is an illustration for the light-guiding device inside the optical chassis of the optical scanner according to the prior arts.
Figure 3C:
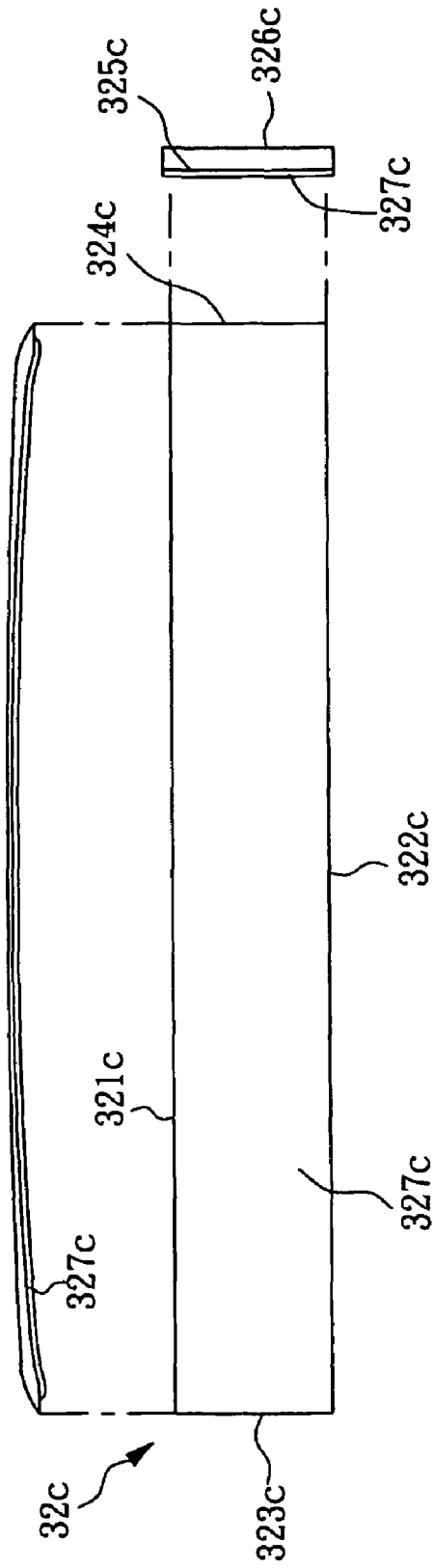
FIG. 3C illustrates the upper view, the front view, and the side view of the No. 3 concave mirror according to the invention.

As shown in FIG. 3A, FIG. 3B, and FIG. 3C, which are three executing patterns for the curving mirrors of the invention: the No. 1 curving mirror 32a, the No. 2 curving mirror 32b, and the No. 3 curving mirror 32c.

As shown in FIG. 3A, in which the No. 1 curving mirror 32a has a surface similar to circular pillar or straight barrel, and the No. 1 curving mirror 32a has two parallel long sides (i.e., the first long side 321a and the second long side 322a), two short sides (i.e., the first short side 323a and the second short side 324a) that are intercrossed with the two long sides, and the two planes (i.e., the first plane 325a and the second plane 326a) that are corresponded to each other and are defined by each long side and each short side respectively. On the No. 1 curving mirror 32a, by bending the two short sides 323a, 324a toward same side direction and keeping the two long sides 321a, 322a still, it may make the first plane 325a bent inwardly and the second plane 326a projected outwardly, such that the No. 1 curving mirror 32a is formed.

As shown in FIG. 3B, in which the No. 2 curving mirror 32b has a surface similar to circular ball or elliptic ball, and the No. 2 curving mirror 32b has two parallel long sides (i.e., the first long side 321b and the second long side 322b), two short sides (i.e., the first short side 323b and the second short side 324b) that are intercrossed with the two long sides, and two planes (i.e., the first plane 325b and the second plane 326b) that are corresponded to each other and are defined by each long side and each short side respectively. On the No. 2 curving mirror 32b, by bending the two short sides 323b, 324b and the two long sides 321b, 322b toward same side direction, it may make the first plane 325b bent inwardly and the second plane 326b projected outwardly, such that the No. 2 curving mirror 32b is formed.

As shown in FIG. 3C, in which the No. 3 curving mirror 32c has a surface similar to circular pillar or straight barrel, and the No. 3 curving mirror 32c has two parallel long sides (i.e., the first long side 321c and the second long side 322c), two short sides (i.e., the first short side 323c and the second short side 324c) that are intercrossed with the two long sides, and two planes (i.e., the first plane 325c and the second plane 326c) that are corresponded to each other and are defined by each long side and each short side respectively. On the No. 3 curving mirror 32c, by bending the two long sides 321c, 322c toward same side direction and keeping the two short sides 323c, 324c still, it may make the first plane 325c bent inwardly and the second plane 326c projected outwardly, such that the No. 3 curving mirror 32c is formed.

In one preferable embodiment, each curving mirror 32a, 32b, 32c of the invention may be structured as thin plate made of non-glass and flexible materials, and three coating layers 327a, 327b, 327c made of light-reflective materials are arranged and distributed over the inner curving surfaces of the thin plates (i.e., the first surfaces 325a, 325b, 325c) for providing the function of light-reflective surface. Wherein, the light-reflective materials of the coating layers 327a, 327b, 327c may be silver, chromium, aluminum, platinum, or other materials with good light reflectivity, which all may be formed on the thin plate by evaporating sputtering, sputtering, chemical deposition, or other manners, and the thickness of each coating layer 178, 188, 198 may be single layer or may be multi-layer. Furthermore, the material of the thin plate may be one of the following kinds of material, such as: paper, plastic, resin, macromolecular polymer, glass fiber, rubber, metallic film, or other non-glass of flexible material. One thing is worth mentioning: the so-called flexible material is not referred to extremely soft material, but a material that should have appropriate hardness capable of keeping the thin plate itself maintain enough planarity to reach an excellent effectiveness of light reflection but, subjected to external forces, it still may be bent to certain degree to constitute the curving mirrors 32a, 32b, 32c with a specific curvature but not going to be broken and, on the other hand, the flexible materials may also be easily manufactured into different formations relatively, such that its application field may be relatively wider.

Figure 4A:
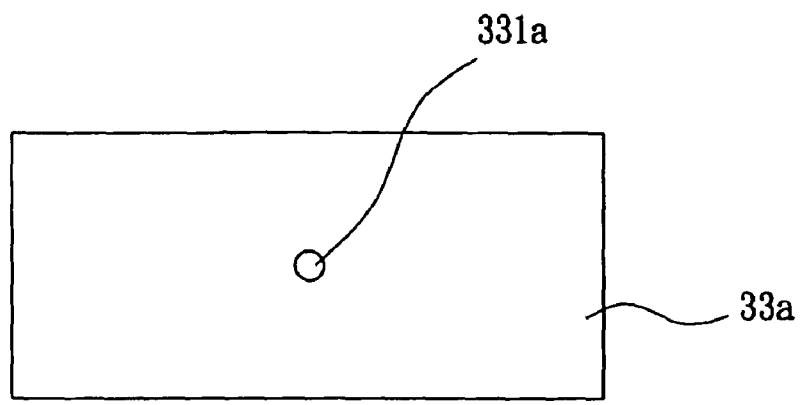
FIG. 4A is an illustration for the first embodiment of the raster according to the invention.
Figure 4B:
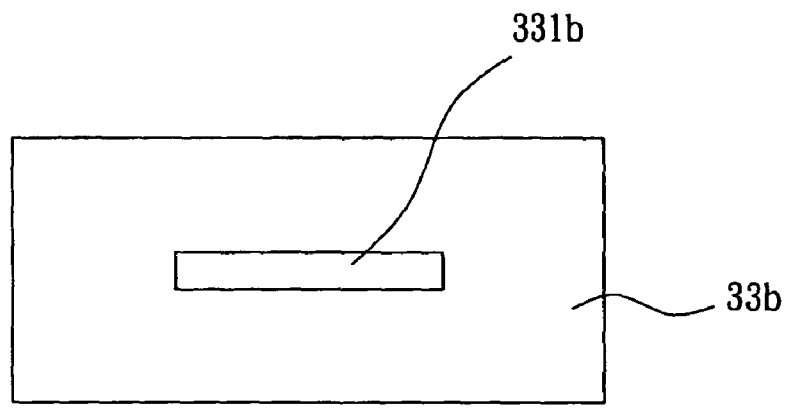
FIG. 4B is an illustration for the second embodiment of the raster according to the invention.
Figure 4C:
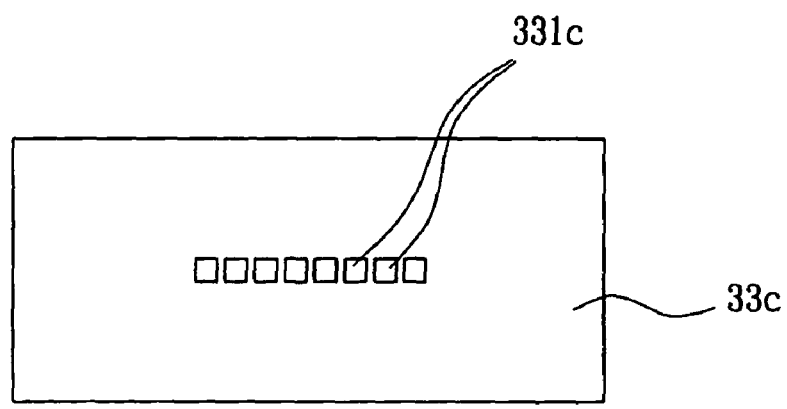
FIG. 4C is an illustration for the third embodiment of the raster according to the invention.

As shown in FIG. 4A, FIG. 4B, and FIG. 4C, which are three illustrations respectively for three different preferable embodiments for the raster according to the invention. In FIG. 4A, the raster 33a has a circular transparent hole 331a, of which the radius is commonly between 2~6 nm preferably. Except the transparent hole 331a, other part of the raster 33a is necessarily comprised of opaque material. The main reason for restricting the size of the transparent hole 331a is that, if the radius of the transparent hole 331 is too large, then it is impossible to provide excellent separation function for unnecessary light and, if the radius is too small, then it is easy to generate light-diffracting phenomenon, so the size of the transparent hole 331a of the raster 33a must be restricted within specific range, such that a preferable quality of scanned image may be provided. In FIG. 4B, the transparent hole of the raster 33b is a transparent hole 331b shown as a long narrow stripe and extended horizontally. The width (i.e., the narrower side) of this transparent hole 331b shown as long narrow stripe is commonly between 2~6 mm preferably. In FIG. 4C, the number of the transparent hole 331c of the raster 33c is plural and each transparent hole 331c is shown as long narrow stripe and extended horizontally, and the width or the radius of each transparent hole 331c is commonly between 2~6 mm preferably.

Figure 5A:
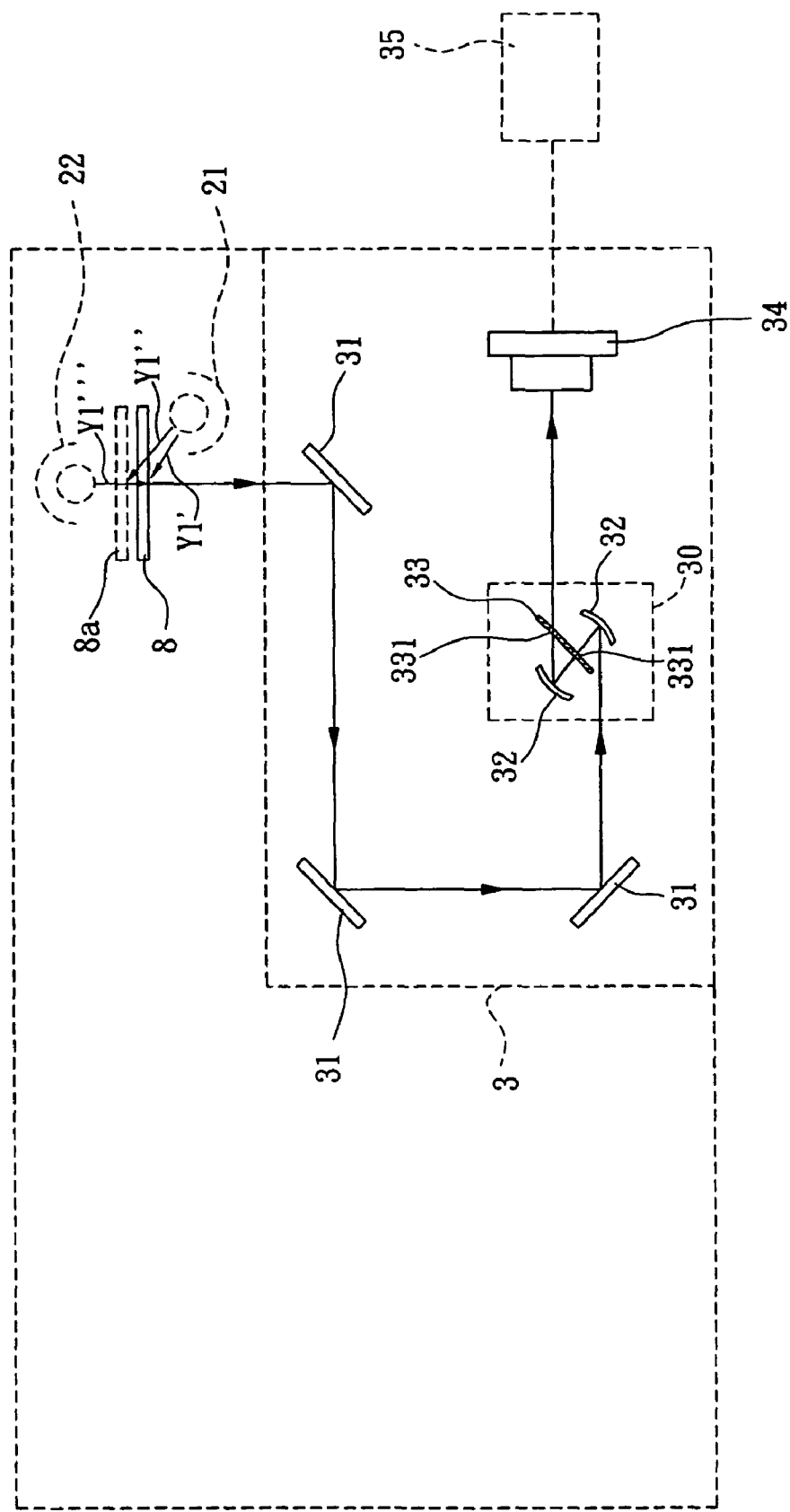
FIG. 5A is an illustration for the first preferable embodiment for the optical route of the optical device of the optical scanner according to the invention.
Figure 5B:
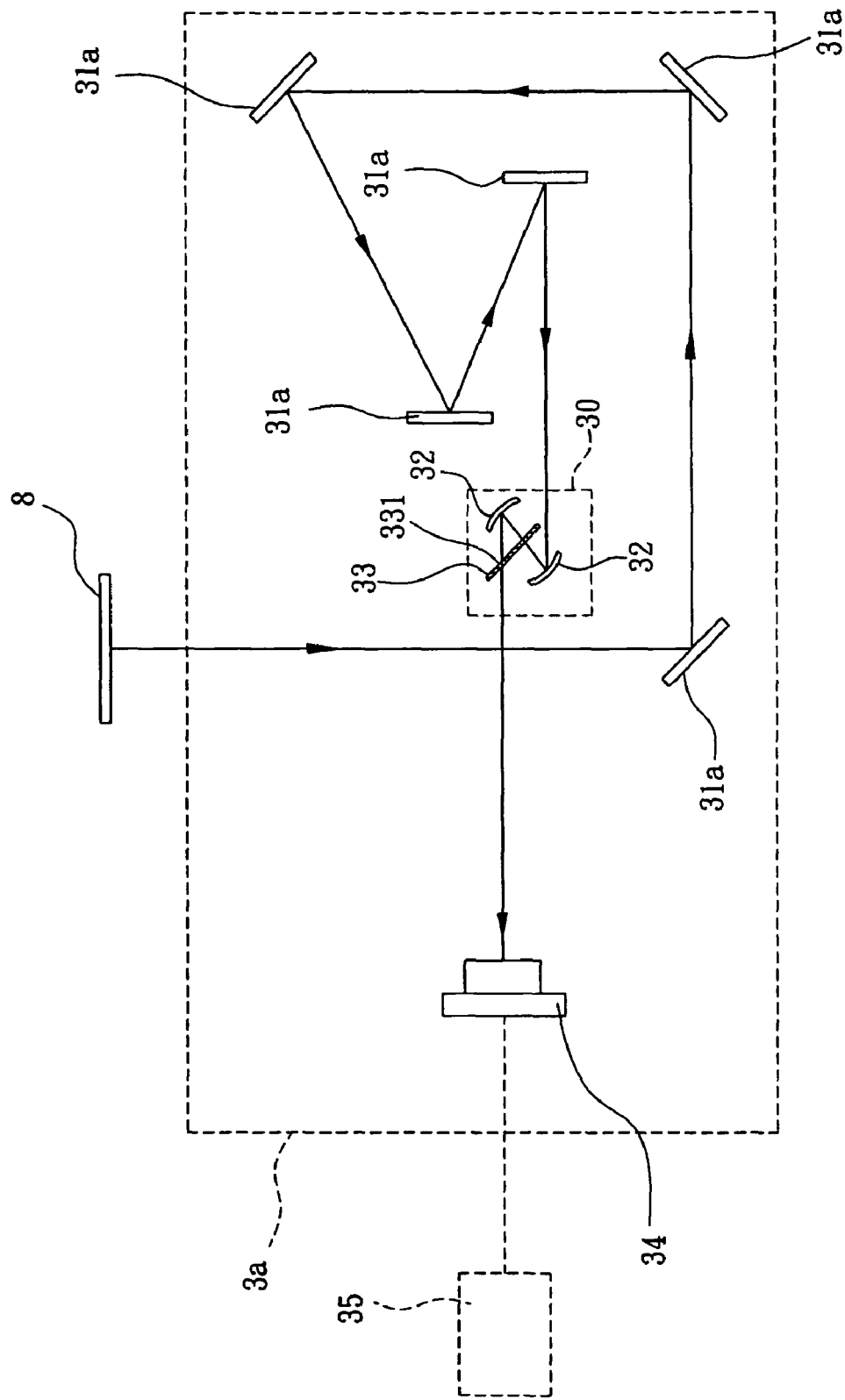
FIG 5B is an illustration for the second preferable embodiment for the optical route of the optical device of the optical scanner according to the invention.
Figure 5C:
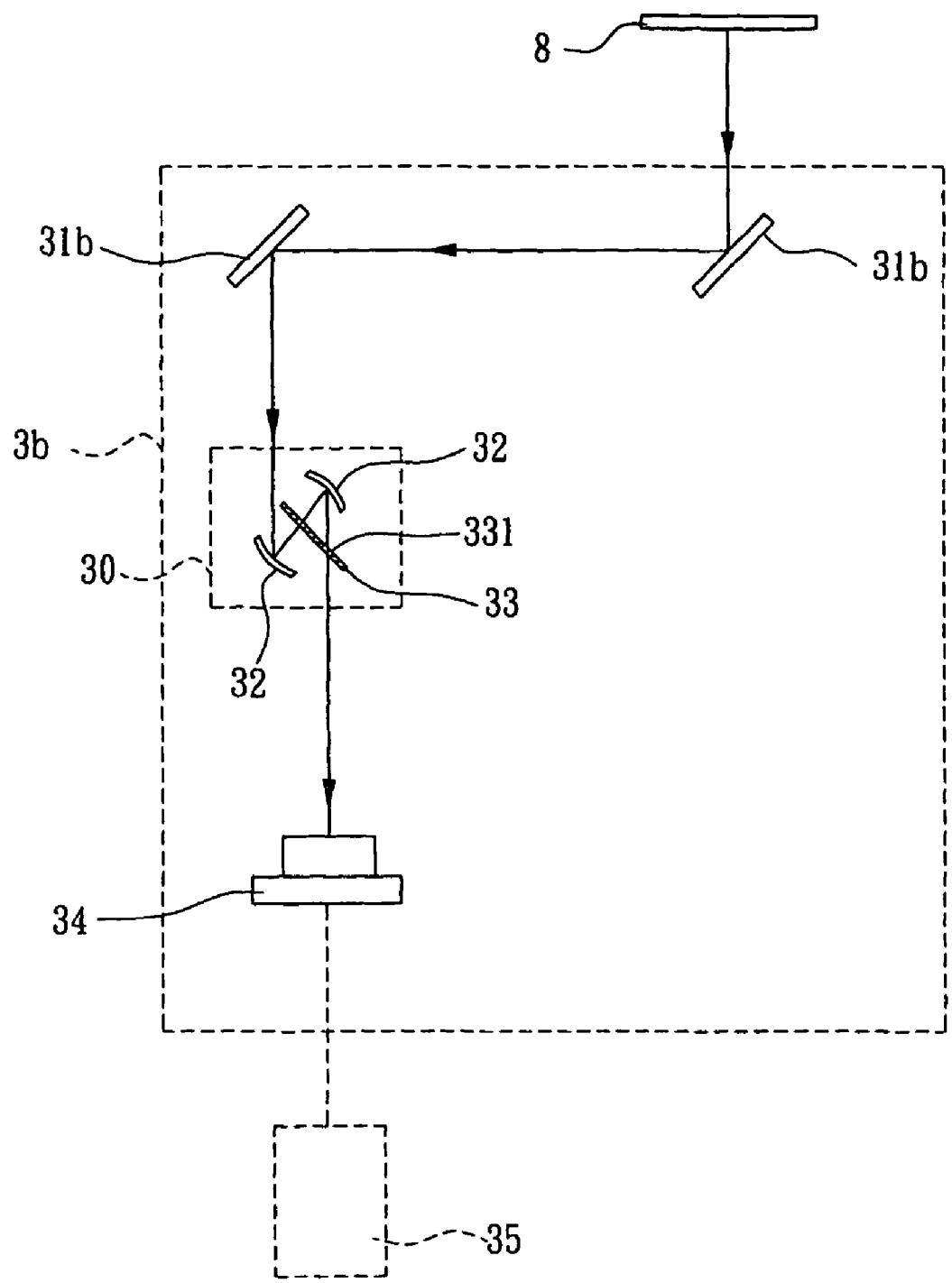
FIG. 5C is an illustration for the third preferable embodiment for the optical route of the optical device of the optical scanner according to the invention.

Please refer to FIG. 5A to FIG. 5C, which are illustrations respectively for several preferable embodiments for the optical route of the optical device of the scanner according to the invention. As shown in FIG. 5A, when the optical scanning device 2 of the invention intends to proceed a reflective scanning mode on an object to be scanned 8, the light image reflected from the object to be scanned 8 enters an optical device 3; at this time, the optical length of the light emitted from the light source 21 and proceeding to the object to be scanned 8 is Y1'; when the optical scanning device 2 intends to proceed a paper-feeding scanning mode on an object to be scanned 8a, the object to be scanned 8a is located little higher than the position of the original object to be scanned 8, so the light emitted from the first light source 21 and incident upon the object to be scanned 8a is then reflected from the object to be scanned 8a and enters the optical device 3; at this time, the optical length of the light emitted from the first light source 21 and entering the object to be scanned 8a is Y1"; when the optical scanning device 2 intends to proceed a transparent scanning mode on an object to be scanned 8, a light emitted from a second light source 22, incident toward the object to be scanned 8, and penetrating through it enters the optical device 3; at this time, the optical length of the light emitted from the second light source 22 and incident upon the object to be scanned 8 is Y1'''.

In the preferable embodiment of the invention, the optical device 3 of a scanner may receive the light of the image coming from an object to be scanned 8, wherein the optical device 3 includes: several reflective mirrors 31, a light-focusing module 30, and a charge coupled device 34. The reflective mirror 31 is provided for reflecting and directionally changing the light and, through appropriately arranging the several reflective mirrors 31, the light of the image of the object to be scanned 8 is directionally changed to a predetermined route. With at least one curving mirror 32, the light-focusing module 30 focuses the light of the predetermined route and directionally changes it to the charge coupled device 34, which receives the light directionally changed by and coming from the light-focusing module 30 and converts it into electronic signals, and the light-focusing module 30 further has a raster 33, which is located in the optical route of the curving mirror 32 and is applied for filtering out the unnecessary light.

In the preferable embodiment shown in FIG. 5A, the arranging manner of the optical path is to apply three reflective mirrors 31 to proceed reflection and directional change to the light of the image coming from the object to be scanned 8 to be guided to a predetermined route, and the optical length is thereby elongated, while the reflective mirror 31 has no light-focusing function. The difference between the preferable embodiment of FIG. 5B with that of said FIG. 5A is that: this embodiment applies more piece (five pieces) of reflective mirror 31a and appropriate design of optical route to obtain an optical device 3a with smaller volume under the condition of equal total track; while the difference between the preferable embodiment of FIG. 5C with that of said FIG. 5A is that: this preferable embodiment applies less piece (two pieces) of reflective mirror 31b and appropriate design of optical route to make the optical device 3b formed into a three-dimensional structure.

Figure 8:
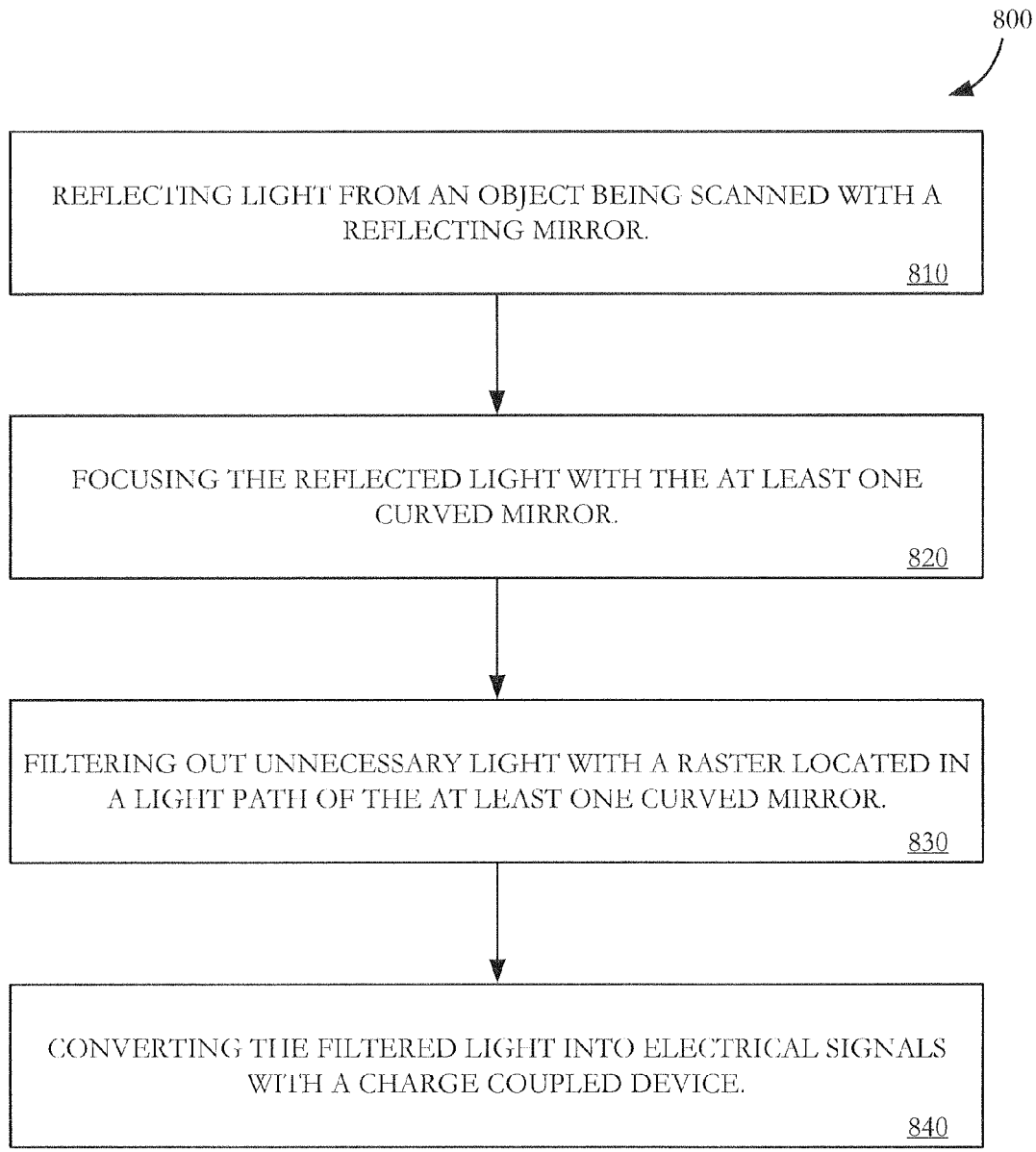
FIG. 8 shows a flow chart illustrating an example method of optically processing an object being scanned.

Referring to FIG. 8, a flow chart 800 illustrates an example method of optically processing an object being scanned is shown. The example method includes reflecting light from the object being scanned with a reflecting mirror (at operation 810), focusing the reflected light with the at least one curved mirror (at operation 820), filtering out unnecessary light with a raster located in a light path of the at least one curved mirror (at operation 830), and converting the filtered light into electrical signals with a charge coupled device (at operation 840).

In this preferable embodiment of the invention, the number of the curving mirror 32 of the light-focusing module 30 is two. One is used to receive the light image transferred from the predetermined route, focus it, and then transfer it again. The other one transfers the light focused and transferred by the said mirror 32 to the charge coupled device 34. In this preferable embodiment, both the curving mirrors 32 have same curvature respectively. Of course, in order to enhance the brilliance of the scanned image, it may also be possible to design these two curving mirrors 32 into two curving mirrors 32 that have different curvatures respectively, while the raster 33 is located in optical route that may be between the charge coupled device 34 and the curving mirror 32, the reflective mirror 31 and the curving mirror 32, or the curving mirror 32 and the curving mirror 32, etc. In the preferable embodiment, the transparent hole 331 of the raster 33 is located in the optical route at the position of the neighborhood of the focusing point, such that a better function for filtering unnecessary light is provided. When different scanning modes are undertaken, the scanning quality will be influenced because of the different optical lengths such as Y1', Y1", or Y1''' so, preferably, the optical device 3 may further be arranged with an image adjustable module 35, such that the light image focused by the curving mirror 32 may be calibrated and adjusted. Of course, by designing the reflective mirror 31 to be adjustable, the relative positions of the several reflective mirrors 31 may be adjusted for changing an optical length of a scanning procedure. The several adjustable reflective mirrors 31 have been arranged appropriately, such that the light of the image of the object to be scanned 8 is directionally changed to a predetermined route.

Figure 6:
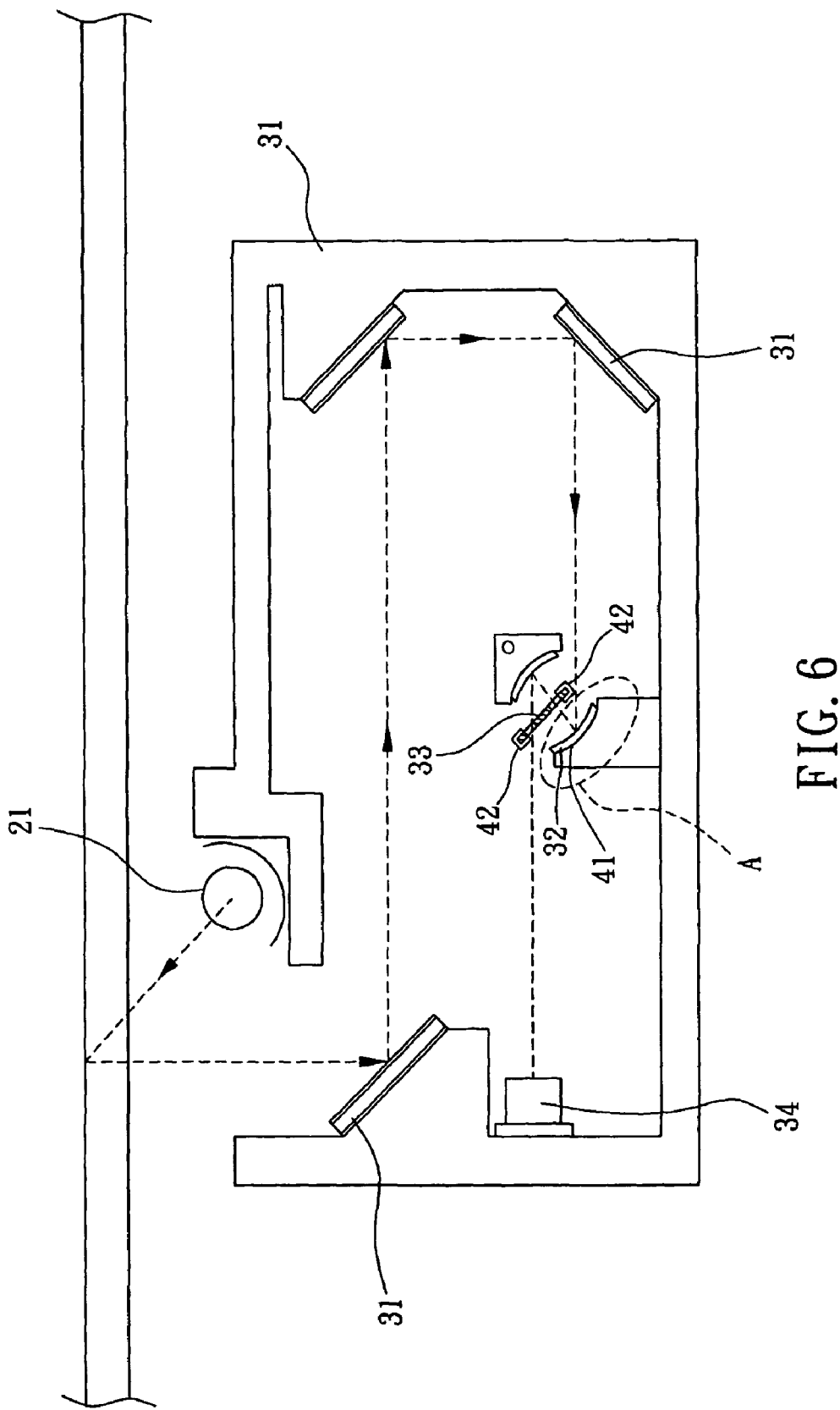
FIG. 6 is an illustration for a preferable embodiment for the connecting structure between the casing and the concave mirror of the optical device according to the invention.
Figure 7:
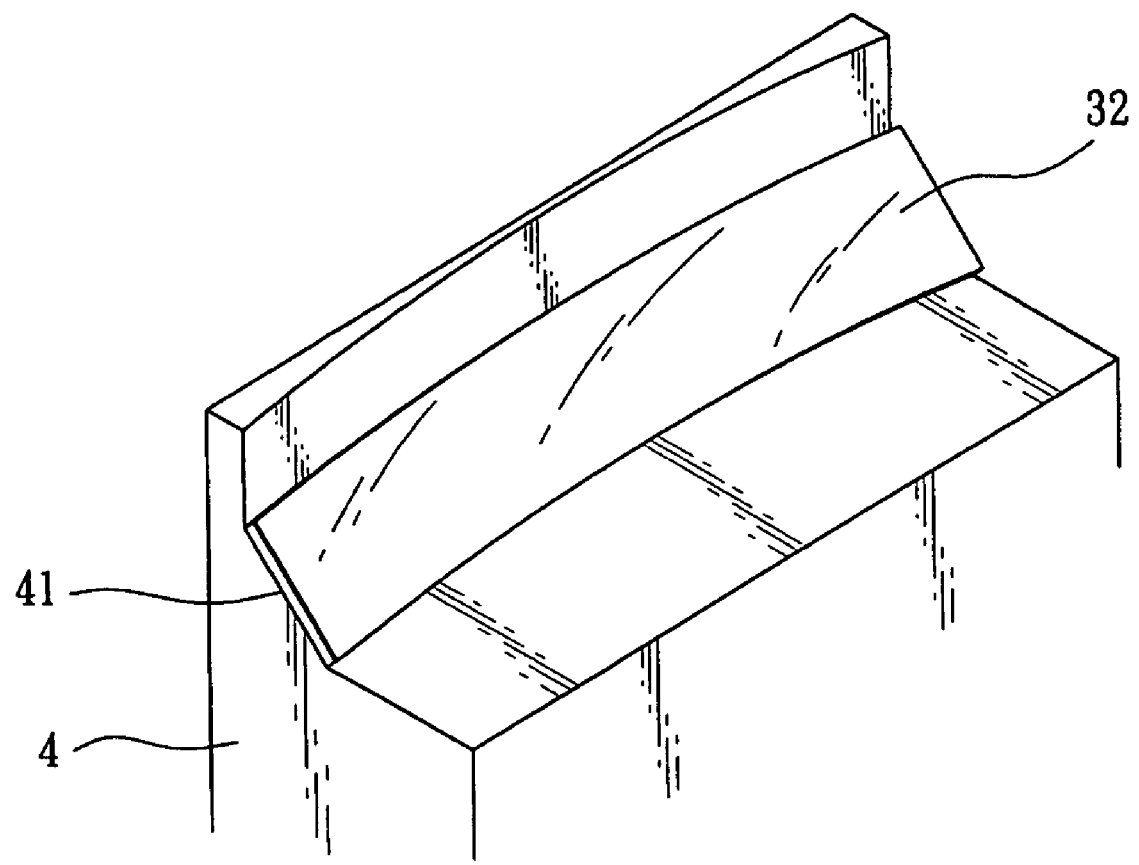
FIG. 7 is a partially enlarged 3-D illustration for the A zone shown in FIG. 6.

Please refer to FIG. 6 and FIG. 7, which illustrate a preferable embodiment for the connecting structure between the casing and the concave mirror of the optical device according to the invention. The optical device 3 of the invention is further comprised of a casing 4 available for accommodating and positioning the reflective mirror 31, the light source 21, the light-focusing module 30, and the charge coupled device 34. Furthermore, several connecting surfaces 41 are formed with corresponding predetermined angles and positions at the predetermined positions on the side surfaces in the casing 4 for providing the connecting and positioning functions to the curving mirror 32 and the reflective mirror 31. Additionally, the connecting surface 41 is designed as a curving formation with appropriate curvature for matching the curving outer appearance of the curving mirror 32, such that the curving mirror 32 may be directly accommodated and positioned in the connecting surface 41. As described therein before, since the curving mirror 32 may be preferably comprised of a flexible material, so it may be connected and combined on the connecting surface 41 by any direct connecting method to comprise the curving mirror 32, and an open groove 42 may be further arranged for accommodating the raster 33. Therefore, when the optical device 3 is assembled, it may just directly paste and position the light-reflective element formed as thin plate that is manufactured by flexible materials and is coated with light-reflective layer onto the connecting surface 41 formed as curving surface in the casing 4, so the structure of the curving mirror 32 may be directly formed with very easy, time-saving procedure and low cost. Furthermore, it is very easy to machine, bend, or design the flexible thin-plated structure made of non-glass materials into a light-reflective device with curving surface or irregular shape available for special requirement.

What is claimed is:

1. A light focusing module for a scanner having at least one reflecting mirror for receiving light from an object being scanned and a charge coupled device for receiving light from the light focusing module and converting it to electronic signals, comprising:

at least one curving mirror configured to receive and focus light from the reflecting mirror; and a raster located in a light route of the curving mirror and configured to filter out unnecessary light.

2. The light focusing module of claim 1 wherein the raster is located in the light route between the curving minor and the reflecting mirror.

3. The light focusing module of claim 1 wherein the raster is located in the light route between the curving minor and the charge coupled device.

4. The light focusing module of claim 1 further comprising at least two curving minors.

5. The light focusing module of claim 4 wherein the raster is located in the light route between the two curving minors.

6. The light focusing module of claim 1 wherein the raster has at least one transparent hole.

7. The light focusing module of claim 1 wherein the light focusing module is housed in a casing.

8. The light focusing module of claim 7 wherein the curved minor is integrated on a surface of the casing.

9. The light focusing module of claim 8 wherein the surface of the casing is curved such that the surface of the casing matches or nearly matches the curved minor.

10. The light focusing module of claim 8 wherein the curved minor is made of a flexible material and affixed on the surface of the casing.

11. The light focusing module of claim 1 wherein the curving mirror is configured to directionally change the light received from the reflecting mirror.

12. An optical device comprising:
a light focusing module, comprising:
at least one curving mirror configured to focus light reflected from at least one reflective minor; and
a raster, which is provided in a light route of the curving mirror and being configured to filter out unnecessary light; and
a charge coupled device configured to convert the light coming from the light-focusing module into electronic signals.

13. The optical device of claim 12 further comprising at least two reflective mirrors.

14. The optical device of claim 13 wherein the at least two reflective minors are adjustable.

15. The optical device of claim 13 wherein the at least two reflecting mirrors are configured to directionally change the light received from the object being scanned to a predetermined route.

16. The optical device of claim 12 wherein the curving minor is configured to directionally change the light received from the at least one reflecting mirror.

17. A method of optically processing an object being scanned comprising:
reflecting light from the object being scanned with a reflecting minor;
focusing the reflected light with the at least one curved mirror;
filtering out unnecessary light with a raster located in a light path of the at least one curved minor; and
converting the filtered light into electrical signals with a charge coupled device.

18. The method of claim 17 further comprising directionally changing the light with the at least one curved mirror.

19. The method of claim 17 further comprising reflecting the light with another reflecting mirror.

20. The method of claim 19 further comprising adjusting the reflecting mirrors to move the light of the object being scanned to a predetermined route.

21. The method of claim 17 further comprising receiving the focused light with another curved mirror.

22. The method of claim 21 wherein the raster is located in the light path between the two curving mirrors.

23. The method of claim 17 wherein the raster is located in the light path between the curving minor and the reflecting mirror.

24. The method of claim 17 wherein the raster is located in the light path between the curving minor and the charge coupled device.

25. The method of claim 17 wherein the raster has at least one transparent hole.

26. A method of focusing light in a scanner comprising:
focusing reflected light with at least one curved minor;
filtering out unnecessary light with a raster located in a light path of the at least one curved minor; and
converting the filtered light into electrical signals with a charge coupled device.

27. The method of claim 26 further comprising receiving the focused light with another curved mirror.

28. An optical device of a scanner, comprising:
means for reflecting light from an object being scanned;
at least one curved mirror to focus light reflected from the means for reflecting;
means for filtering out unnecessary light, wherein the at least one curved mirror is configured to focus the light towards the means for filtering; and
means for converting the light from the at least one curved mirror into electronic signals.

29. The optical device of claim 28 wherein the at least one curved mirror is configured to directionally change the light reflected from the means for reflecting.

30. A light focusing module for a scanner having at least one reflecting mirror for receiving light from an object being scanned and a charge coupled device for receiving light from the light focusing module and converting it to electronic signals, comprising:
at least one curved mirror to focus light from the reflecting mirror; and
means for filtering out unnecessary light, wherein the at least one curved mirror is configured to direct the light towards the means for filtering.

31. The light focusing module of claim 30 wherein the at least one curved minor is configured to directionally change the light.

* * * * *

UNITED STATES PATENT AND TRADEMARK OFFICE
CERTIFICATE OF CORRECTION

PATENT NO.         : 8,111,434 B2
APPLICATION NO.    : 11/511740
DATED              : February 7, 2012
INVENTOR(S)        : Huang et al.

It is certified that error appears in the above-identified patent and that said Letters Patent is hereby corrected as shown below:

Title page, item (30), under "Foreign Application Priority Data" in Column 1, Line 1,
delete "Sep. 10, 2002 (TW) ........... 91215035 U" and
insert -- Sep. 24, 2002 (TW) ........... 91215035 U --.

Column 1, line 10, delete "Sep. 10, 2002." and insert -- Sep. 24, 2002. --.

Column 7, line 6, in Claim 2, delete "minor" and insert -- mirror --.

Column 7, line 9, in Claim 3, delete "minor" and insert -- mirror --.

Column 7, line 12, in Claim 4, delete "minors." and insert -- mirrors. --.

Column 7, line 14, in Claim 5, delete "minors." and insert -- mirrors. --.

Column 7, line 21, in Claim 8, delete "minor" and insert -- mirror --.

Column 7, line 24, in Claim 9, delete "minor." and insert -- mirror. --.

Column 7, line 26, in Claim 10, delete "minor" and insert -- mirror --.

Column 7, line 34, in Claim 12, delete "minor;" and insert -- mirror; --.

Column 7, line 39, in Claim 12, delete "light-focusing" and insert -- light focusing --.

Column 7, line 44, in Claim 14, delete "minors" and insert -- mirrors --.

Column 7, line 50, in Claim 16, delete "minor" and insert -- mirror --.

Column 7, line 55, in Claim 17, delete "minor;" and insert -- mirror; --.

Signed and Sealed this
Twenty-ninth Day of January, 2013

David J. Kappos
*Director of the United States Patent and Trademark Office*

CERTIFICATE OF CORRECTION (continued)
U.S. Pat. No. 8,111,434 B2

Column 8, line 2, in Claim 17, delete "minor;" and insert -- mirror; --.

Column 8, line 17, in Claim 23, delete "minor" and insert -- mirror --.

Column 8, line 20, in Claim 24, delete "minor" and insert -- mirror --.

Column 8, line 25, in Claim 26, delete "minor;" and insert -- mirror; --.

Column 8, line 27, in Claim 26, delete "minor;" and insert -- mirror; --.

Column 8, line 55, in Claim 31, delete "minor" and insert -- mirror --.